US006456053B1

(12) United States Patent
Rowley

(10) Patent No.: US 6,456,053 B1
(45) Date of Patent: Sep. 24, 2002

(54) METAL DETECTOR FOR FINDING WALL STUDS

(76) Inventor: Vance Rowley, 1246 S. Shelton St., Santa Ana, CA (US) 92707

(*) Notice: Subject to any disclaimer, the term of this patent is extended or adjusted under 35 U.S.C. 154(b) by 0 days.

(21) Appl. No.: 09/586,397

(22) Filed: Jun. 2, 2000

Related U.S. Application Data

(63) Continuation-in-part of application No. 29/105,807, filed on Jun. 2, 1999.

(51) Int. Cl.[7] .............................................. G01R 19/00
(52) U.S. Cl. ........................................................ 324/67
(58) Field of Search .......................... 324/202, 67, 326, 324/327, 329

(56) References Cited

U.S. PATENT DOCUMENTS 3,363,208 A * 1/1968 Balet ............................ 324/67
3,985,326 A * 10/1976 Kittstein ................... 248/218.4
D374,595 S * 10/1996 Welder ......................... D8/14
6,229,294 B1 * 5/2001 Wun ............................ 324/67

* cited by examiner

Primary Examiner—Jay Patidar
(74) Attorney, Agent, or Firm—Gene Scott-Patent Law & Venture Group

(57) ABSTRACT

An apparatus for finding studs within walls has an elongated magnet having a round and smooth outer surface. The magnet is attached at one of its ends to a bead chain wherein each of he beads is able to rotate relative to the next so that the magnet is essentially free of any restriction in rotating about its long axis with respect to the chain. In use, the magnet is held suspended from the bead chain and moved across a wall until it detects a metal object within the wall. The magnet then rotates against the wall until it places itself at the center of the object thus defining the center of a stud or other hidden object.

7 Claims, 2 Drawing Sheets

METAL DETECTOR FOR FINDING WALL STUDS

The present utility patent application is a continuation-in-part of a previously filed design patent application having Ser. No. 29/105,807 and an assigned filing date of Jun. 2, 1999 and which contains subject matter substantially the same as that described in the present application.

BACKGROUND OF THE INVENTION

1. Field of the Invention

This invention relates generally to metal detectors and more particularly to an apparatus for quickly finding wall studs and other items containing ferrous components but which are located behind wall surfaces and the like.

2. Description of the Related Art

The prior art teaches that magnets may be used to detect hidden objects containing iron or nickel metal components. Such magnets have been used to find nails and studs in and behind walls. However, the prior art does not teach that such a magnet may be constructed as defined herein and used as so defined in order to improve the ability of a workman to very quickly establish the location of a metal stud with precision. The present invention fulfills these needs and provides further related advantages as described in the following summary. Stud finders are common and use a variety of principles. A very common device having a trademark: StudSensor™ is manufactured and distributed by Zircon Manufacturing, Inc. and protected by U.S. Pat. No. 4,099,118. Such devices use a capacitive or inductive reactance technique for sensing the presence of hidden objects. These devices are relatively expensive, slow in use and easily damaged. They also require batteries which require replacement from time to time.

SUMMARY OF THE INVENTION

The present invention teaches certain benefits in construction and use which give rise to the objectives described below.

The present invention uses an elongated magnet having a round and smooth outer surface. The magnet is attached at one of its ends to a bead chain wherein each of he beads is able to rotate relative to the next so that the magnet is essentially free of any restriction in rotating with respect to the chain. In use the magnet is held dangling from the bead chain and moved across a wall until it detects a metal object within the wall. The magnet then rotates until it places itself at the center of the object. The invention distinguishes between metal and wood studs by the aggressiveness by which the magnet moves toward the metal object, i.e., quickly for studs and more slowly toward nails and screws. It is immune to false action due to nearby electrical or plumbing lines since neither interfere with the magnetic attraction between the invention and iron bearing objects. The invention does not require reading of scales, observance and interpretation of blinking lights and does not mark the walls in which it comes into contact.

A primary objective of the present invention is to provide a metal detector for finding hidden objects having advantages not taught by the prior art.

Another objective is to provide such an invention capable of finding wall studs and other metal objects within a wall.

A further objective is to provide such an invention capable of quickly establishing the vertical center line of a wall stud.

A still further objective is to provide such an invention capable of being fabricated and brought to market at a very low relative price.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings

DETAILED DESCRIPTION OF THE INVENTION

Figure 1:
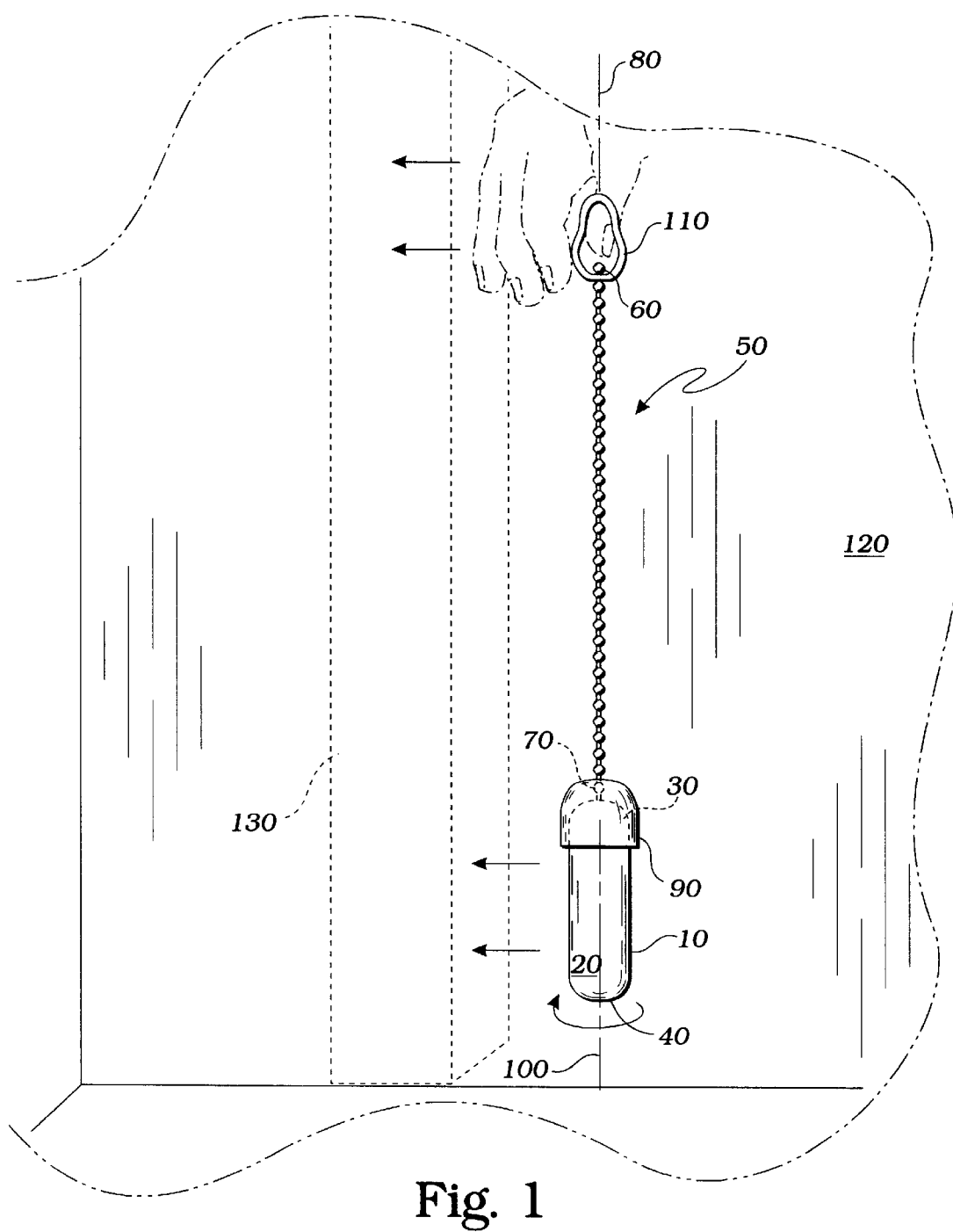
FIGS. 1 and 2 are perspective views of the preferred embodiment of the invention.

The above described drawing figures illustrate the invention, an apparatus for detecting metal objects behind walls.

The apparatus is able to find studs and other metal objects behind walls. It comprises an elongate magnet 10 having a round and smooth outer surface 20 terminating at opposing magnet ends 30, 40. The magnet is preferably made of a nickel, aluminum and cobalt alloy generally referred to by the common name "Alnico." Such magnets, such as the well known "cow magnet" have a relatively high magnetization and are inexpensive to produce. Other magnetic materials may be used for the present invention as may be desired. Such magnets are magnetically attractive to objects containing nickel or iron.

A magnet suspending means such as a steel bead chain 50 has a pair of magnet suspending means ends 60, 70. Such bead chains 50 are well known in the art and were popularized during World War II when they were used for GI's dog tags. Bead chains are made up of links which are round steel beads joined to each other by steel wires in such a manner that each bead is able to rotate relative to the next bead and this allows such a chain to freely rotate about its long axis 80 so as to avoid being wound up about such long axis much as a string, cord or chain might be.

Alternately to a steel bead chain, any other suspending means maybe used such as a string, wire or chain, in conjunction-with a connector element (not shown) that allows the magnet 10 to rotate relative to the suspending means. Unrestricted rotation of the magnet 10 is critical to the operation of the instant invention so as to allow the magnet 10 to find the center of a stud or other hidden metal object without being thwarted in its ability to rotate. A means for attaching 90 one of the bead chain ends 60 to one of the elongate magnet ends 30 is provided such that a long axis 100 of the elongate magnet 10 is colinear with the long axis 80 of the bead chain 50 when the elongate magnet 10 is suspended at the end of the bead chain 50. The apparatus further preferably comprises a fixture 110 at the other end 40 of the bead chain 30, the fixture enabled for hanging the apparatus from a protruding nail or the like so as to enable the apparatus to be hung in readiness for use.

The means for attaching 90 preferably comprises a plastic cap as shown in the figures. The one end 70 of the bead chain is cemented within the cap 90 and the cap 90 is cemented to the one end 30 of the elongate magnet.

Figure 2:
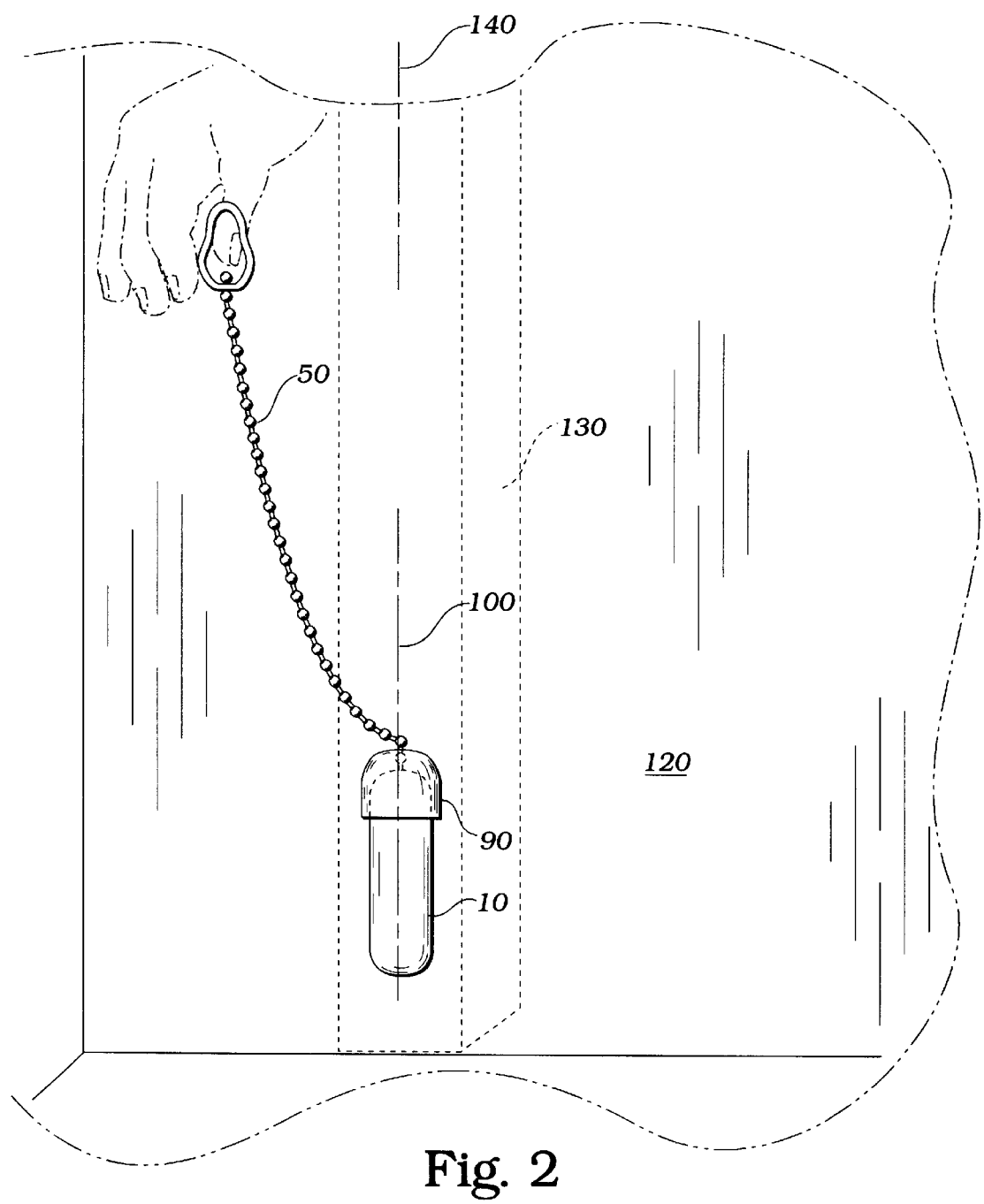

Preferably, the magnet 10 is provided with a magnetic strength capable of supporting the weight of the magnet when it is in contact with a wall of ½ to ⅝ inches thickness adjacent to a steel stud 130 as shown in FIG. 2. A stronger magnetic force tends to be counter productive in that the magnet can move with too much force and mar surfaces it comes into contact with. A weaker magnet is not as helpful in that it will not attach to the wall by itself thus leaving the hands of the workman free for placing pencil marks and such.

The present invention further comprises a method of finding studs 130 and other metal objects behind walls. The method comprises the steps of providing the apparatus defined above with its elongate magnet 10 having a round and smooth outer surface 20 terminating at opposing magnet ends 30, 40, and a bead chain 50 having a pair of bead chain ends 60, 70, and a means for attaching 90 one of the bead chain ends 70 to one of the elongate magnet ends 30 such that a long axis 100 of the elongate magnet 10 is colinear with a long axis 80 of the bead chain 50 when the elongate magnet 10 is suspended at the end 70 of the bead chain 50. These steps further include suspending the elongate magnet 10 at the end of the bead chain 50 while the magnet is in contact with a wall surface 120 and then moving the bead chain 50 along the wall surface 120 with the elongate magnet 10 in contact therewith until the elongate magnet 10 detects a wall stud 130 behind the wall and rolls on the wall surface 120 toward it and over it. Finally, the method provides for observing the vertical centerline 100 of the elongate magnet 10 when the elongate magnet comes to rest over the stud 130, said vertical centerline 100 of the elongate magnet 10 defining a vertical centerline 140 of the wall stud 130 behind the wall.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for finding studs and other metal objects behind walls, the apparatus comprising:

an elongate magnet having a round and smooth outer surface with a uniform diameter over a major portion of the length of the elongate magnet and terminating at opposing magnet ends;

a flexible magnet suspending means providing a pair of magnet suspending means ends;

a means for attaching one of the magnet suspending means ends to one of the elongate magnet ends such that a long axis of the elongate magnet is collinear with a long axis of the magnet suspending means when the elongate magnet is suspended at the end of the magnet suspending means;

the magnet suspending means enabled for providing unrestricted rotation of the flexible magnet for rotating against a wall surface when the elongate magnet is suspended therefrom with the round and smooth outer surface positioned in contact with the wall surface, and further enabled for seeking the centerline of a metal stud through freely rolling on the wall surface.

2. The apparatus of claim 1 further comprising a fixture at the other end of the magnet suspending means, the fixture enabled for hanging the apparatus from a nail.

3. The apparatus of claim 1 wherein the attaching means comprises a plastic cap.

4. The apparatus of claim 1 wherein the magnet suspending means is a length of bead chain.

5. The apparatus of claim 1 wherein the magnet provides a magnetic strength capable of stationary support of the weight of the magnet when the magnet is in contact with a wall adjacent to a steel stud.

6. A method of finding studs and other metal objects behind walls, the method comprising the steps of: providing an elongate magnet having a round and smooth outer surface with a uniform diameter over a major portion of the length of the elongate magnet and terminating at opposing magnet ends, and a flexible magnet suspending means having a pair of magnet suspending means ends, and a means for attaching one of the magnet suspending means ends to one of the elongate magnet ends such that a long axis of the elongate magnet is collinear with a long axis of the magnet suspending means when the elongate magnet is suspended at the end of the magnet suspending means; suspending the elongate magnet at the end of the magnet suspending means such that the round and smooth outer surface is in contact with a wall surface; and moving the magnet suspending means along the wall surface with the elongate magnet in contact therewith and rolling thereon, until the elongate magnet detects a wall stud behind the wall and rolls on the wall surface theretoward; observing the vertical centerline of the elongate magnet when the elongate magnet comes to rest, said vertical centerline of the elongate magnet defining a vertical centerline of the wall stud behind the wall.

7. An apparatus for finding studs and other metal objects behind walls, the apparatus comprising:

an elongate magnet having a round and smooth outer surface with a uniform diameter over a major portion of the length of the elongate magnet and terminating at opposing magnet ends, the elongate magnet magnetized along a longitudinal axis;

a flexible magnet suspending means providing a pair of magnet suspending means ends;

a means for attaching one of the magnet suspending means ends to one of the elongate magnet ends such that a long axis of the elongate magnet is collinear with a long axis of the magnet suspending means when the elongate magnet is suspended at the end of the magnet suspending means;

the magnet suspending means enabled for providing unrestricted rotation of the flexible magnet for rotating against a wall surface when the elongate magnet is suspended therefrom with the round and smooth outer surface positioned in contact with the wall surface, and further enabled for seeking the centerline of a metal stud through freely rolling on the wall surface.

* * * * *